June 4, 1968  E. L. JONES  3,386,775
SUPPLEMENTAL BRAKING SYSTEM
Filed July 27, 1966
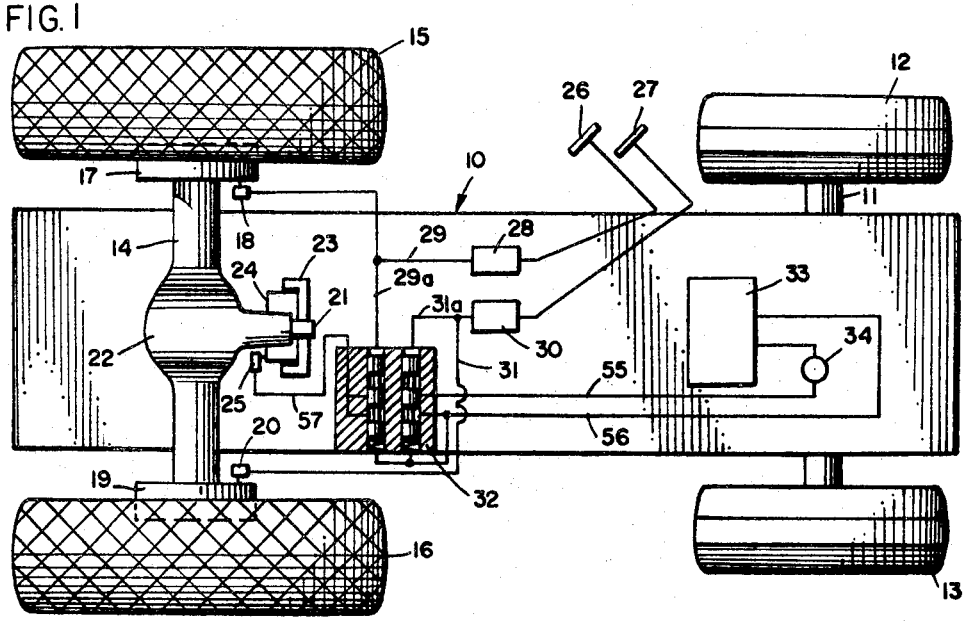
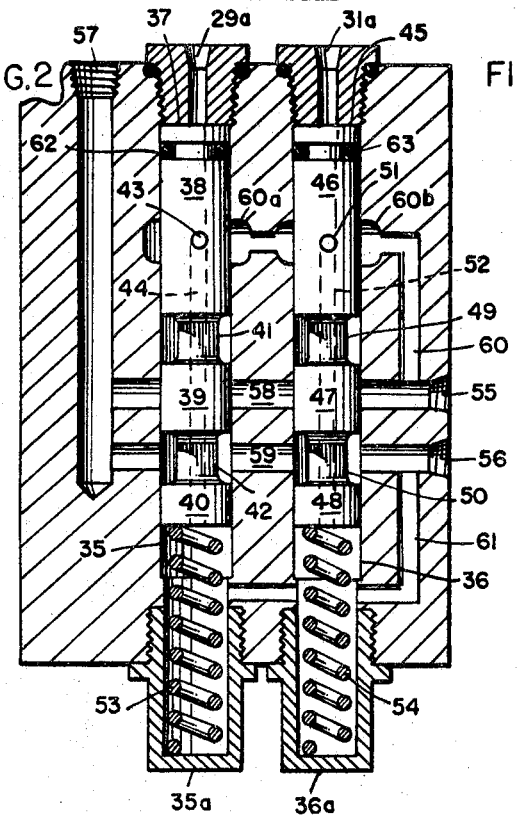
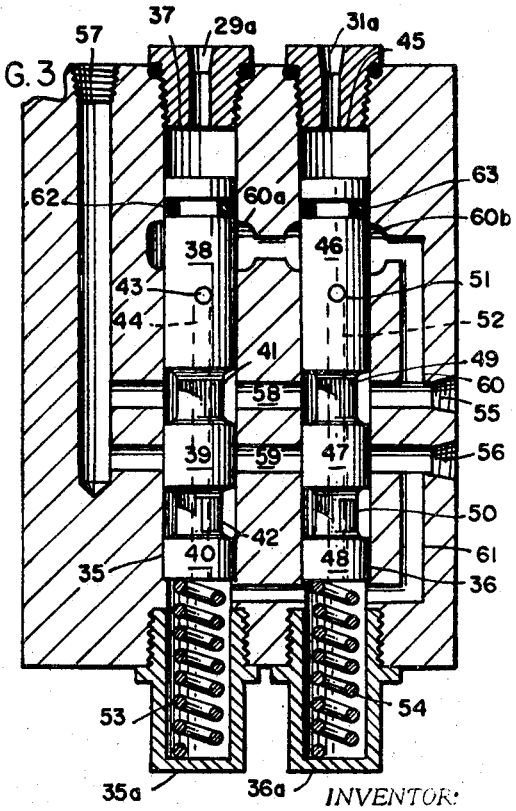
INVENTOR:
EDWIN L. JONES
BY
Dawson, Tilton, Fallon, Lungmus & Alexander
ATT'YS 3,386,775
SUPPLEMENTAL BRAKING SYSTEM
Edwin L. Jones, Libertyville, Ill., assignor to The Hy-Dynamic Co., Lake Bluff, Ill., a corporation of Illinois
Filed July 27, 1966, Ser. No. 568,313
3 Claims. (Cl. 303—2)

This invention relates to braking apparatus and, more particularly, to braking apparatus for use with heavy-duty vehicles such as earth-handling machines.

The invention finds particular utility when used with construction machines or earth-handling machines such as disclosed in United States Patent No. 3,047,170, issued July 31, 1962. It is desirable to equip heavy-duty vehicles such as disclosed in the aforementioned patent with a dual braking system so that each of the rear wheels of the vehicle may be braked independently. Independent rear-wheel braking permits better steering control by braking one or the other of the rear wheels depending on which direction the vehicle is to be turned. In the past, however, on heavy-duty vehicles equipped with a dual-braking system, not enough braking pressure could be exerted on the rear wheels when it was desired to actuate both braking systems simultaneously in order to bring the vehicle to a complete stop.

It is, therefore, an object of this invention to provide a vehicle having a dual-braking system with a supplemental braking system. More particularly, it is an object of the present invention to provide a supplemental braking system which is actuated only when both of the individual braking systems have been actuated.

It is a further object of this invention to provide a vehicle with a supplemental braking system which will be actuated only after a predetermined pressure is reached and which provides additional braking pressure for quicker stops and safer operation.

Further objects and advantages will be seen as the specification proceeds.

The invention is explained with reference to a specific embodiment illustrated in the accompanying drawing in which—

FIG. 1 is a schematic diagram showing the inventive braking system in conjunction with a typical four-wheel vehicle;

FIG. 2 is an enlarged fragmentary view of the valve means of the supplemental braking system; and FIG. 3 is a view of the supplemental braking system with the valve means in a different position.

Referring now to FIG. 1, the numeral 10 designates generally a vehicle frame having mounted thereon a front axle 11 with front wheels 12 and 13 attached thereto and rear drive axle 14 with rear wheels 15 and 16 attached thereto. Mounted on rear wheel 15 is wheel brake 17 actuated by wheel brake cylinder 18 and mounted on rear wheel 16 is wheel brake 19 actuated by wheel brake cylinder 20. Rear drive axle 14 is provided with the usual input shaft 21 and differential housing 22.

Mounted on frame 10 are pedal operators 26 and 27. Pedal operator 26 is operably connected with wheel brake cylinder 18 by means of master brake cylinder 28 and conduit 29. Pedal operator 27 is operably connected with wheel brake cylinder 20 by means of master brake cylinder 30 and conduit 31. Thus, only brake 17 can be actuated by pressure on wheel brake cylinder 18 by means of pedal operator 26. Likewise only brake 19 can be actuated by pressure on wheel brake cylinder 20 by means of pedal operator 27.

Also mounted on frame 10 is supplemental braking system including valve block 32, fluid reservoir 33 and fluid pump 34.

Referring now to FIG. 2, valve block 32 is seen to be provided with bores 35 and 36. Received within bore 35 is spool 37 having lands 38, 39, 40; annular grooves 41 and 42; cross drilled hole 43; and center drilled hole 44 extending from hole 43 to the bottom of spool 37. Received within bore 36 is spool 45 having lands 46, 47, 48; annular grooves 49 and 50; cross drilled hole 51; and center drilled hole 52 extending from hole 51 to the bottom of spool 45. Spools 37 and 45 are maintained in their unactuated positions shown in FIG. 2 by springs 53 and 54 respectively, which are positioned at the bottom of bores 35 and 36. The bores are closed by end closure 35a and 36a, respectively.

Mounted to the input shaft 21 is the supplemental nose brake drum 23 and mounted to the differential housing 22 is the supplemental brake cylinder 24 and brake cylinder 25 (see FIG. 1). Fluid reservoir 33 is connected to valve block 32 by conduits 55 and 56 and supplemental brake cylinder 25 is connected to valve block 32 by conduit 57.

Referring again to FIG. 2, conduits 55 and 57 are associated with fluid passage 58 provided in the valve block 32. Fluid passage 58 is seen to be intersected by bores 35 and 36. Conduits 56 and 57 are associated with fluid passage 59 provided in the valve block 32 and fluid passage 59 is also intersected by bores 35 and 36. Conduit 55 is also associated with bypass fluid passage 60 provided in valve block 32, and bypass fluid passage 60 communicates with the annular enlargements 60a and 60b, respectively, of bores 35 and 36. Conduit 56 is associated with bypass fluid passage 61, which communicates with bores 35 and 36.

Received in an annular recess provided at the top of spool 37 and fitted snugly in bore 35 is seal member 62. Received in an annular recess provided at the top of spool 45 and fitted snugly in bore 36 is seal member 63.

Bore 35 is connected to conduit 29 by conduit 29a, and bore 36 is connected to conduit 31 by conduit 31a.

When the vehicle is in operation, pump 34 is constantly in action pumping fluid from reservoir 33 through conduit 55. When neither pedal operator 26 nor 27 is depressed, the spools 37 and 45 are in the unactuated position as shown in FIG. 2. In this position, lands 39 and 47 block fluid passage 58 and the fluid that is pumped through conduit 55 flows through bypass passage 60 into annular enlargements 60a and 60b, through cross holes 43 and 51, through center holes 44 and 52, through the lower ends of bores 35 and 36, through bypass passage 61 and into conduit 56 to return to fluid reservoir 33.

If it is desired to stop only wheel 15, pedal operator 26 is depressed, forcing brake fluid from master cylinder 28 through conduit 29 into wheel brake cylinder 18 actuating wheel brake 17. When the pressure in conduits 29 and 29a is sufficient to overcome the bias of spring 53, spool 37 is forced downwardly into the position shown in FIG. 3. In this position cross hole 43 no longer communicates with passage 60, but fluid pumped through conduit 55 may still reach the fluid reservoir 33 by passing through passage 60, cross hole 51, center hole 52, bore 36, passage 61 and conduit 56. It is seen that when only pedal 26 is depressed, fluid passage 58 is still blocked by land 47 of spool 45.

If it is desired to brake wheel 16, pedal operator 27 is depressed, thereby forcing brake fluid from master cylinder 30 through conduit 31 into wheel brake cylinder 20 actuating wheel brake 19. Once again, after the necessary pressure is reached, the bias of spring 54 is overcome and spool 45 moves downwardly into the position shown in FIG. 3. Cross hole 51 no longer communicates with passage 60, and fluid pumped from fluid reservoir 33 flows through bypass passage 60, through cross hole 43, center hole 44, bore 35, passage 61 and conduit 56 back to reservoir 33. Whether or not either of the rear wheels is braked, the fluid pumped by pump 34 is allowed to return to the reservoir 33 so that the pump is not required to work against a closed circuit.

When it is desired to brake both wheels simultaneously, both pedal operators 26 and 27 are depressed, thereby forcing brake fluid into brake cylinders 18 and 20 actuating wheel brakes 17 and 19, respectively. When the necessary pressure is developed in conduits 29a and 31a, both spools 37 and 45 move downwardly into the position shown in FIG. 3. In this position, fluid passage 58 is unobstructed, and bypass passage 60 is blocked from both cross holes 43 and 51. Passage 59 is blocked by lands 39 and 47 of spools 37 and 45, respectively. Thus, fluid pumped from fluid reservoir 33 by pump 34 through conduit 55 is allowed to pass through fluid passage 58 to conduit 57 into supplemental brake cylinder 25. Flow of fluid is blocked from passing through passage 59 so pressure is developed in supplemental brake cylinder 25, actuating supplemental brake 24 which reacts on brake drum 23 and imparts additional braking force on the vehicle through the rear drive axle input shaft 21.

When it is desired to release the braking force on the rear wheels, the pedal operators are released and springs 53 and 54 force spools 37 and 45 respectively back into the unactuated position shown in FIG. 2. In this position, the fluid that was forced into supplemental brake cylinder 25 is allowed to pass through conduit 57 through fluid passage 59 and back into fluid reservoir 33 by way of conduit 56, thus relieving the braking pressure exerted in the supplemental brake cylinder 25. An additional safety feature results from the fact that in order to come from the both-wheels-braking position to an unbraked position, both pedal operators must first be relieved. If one pedal operator is accidentally released, passage 59 remains blocked by either land 39 or 47 and the pressure in supplemental brake cylinder 25 is not relieved.

The tension in springs 53 and 54 may be adjusted so that the pressure at which spools 37 and 45 are forced downwardly may be varied.

From the foregoing, it is seen that a supplemental braking system has been provided for use with vehicles having an individual rear wheel braking system which provides additional braking force on the drive axle when both of the individual wheel brake systems are actuated. The supplemental braking system provides additional braking effort to be applied at the input shaft of the rear drive axle after braking effort has been developed at the wheels. This additional braking effort is obtained ahead of the axle reduction, thus providing a multiplication of braking effort obtained with the supplemental brake. Also, since the supplemental braking system has an independent circuit, any failure would not affect the conventional braking system to the wheels.

While in the foregoing specification a detailed embodiment of the invention was set forth for the purpose of illustration, it is to be understood that many of the details herein given may be varied considerably by those skilled in the art without varying from the spirit and scope of the invention.

I claim:
1. In a braking system for a vehicle comprising a frame, an axle journaled on said frame with wheels at the axle ends, a braking system for each wheel including an interconnected pedal operator, conduit, cylinder, and wheel brake, an improved supplemental braking system comprising valve means coupled to the conduits of said wheels system, fluid pressure means and supplemental brake cylinder means and brake means operably associated with said valve means, said valve means including a valve block defining bores therein, spool means associated with each of said wheel systems, each of said spool means being slidably received in one of said bores, said valve means being operative when both wheel systems are energized to couple said fluid pressure means and supplemental brake cylinder means for exerting braking force thereagainst.

2. The braking apparatus of claim 1 in which said fluid pressure means includes a pump and supplemental conduit, said spool means being interposed in said supplemental conduit and being movable from a first position to a second position, whereby fluid under pressure may be selectively introduced to said supplemental brake cylinder.

3. The braking apparatus of claim 2 wherein said valve means includes a return conduit for circulating the fluid from a pressure source and said spool means is adapted to block said return conduit and to couple said pressurized fluid to said supplemental brake means when both of said spools are displaced in said spool means and further adapted to continue to block said return conduit if only one of said spool means is returned thereby to continue to apply said supplemental braking power.

References Cited

UNITED STATES PATENTS 2,741,337  4/1956  Ziskal _____ 188—16 X

FOREIGN PATENTS 424,911  3/1935  Great Britain.

DUANE A. REGER, *Primary Examiner.*